(12) United States Patent
Taugher

(10) Patent No.: US 6,401,229 B1
(45) Date of Patent: *Jun. 4, 2002

(54) SYSTEM AND METHOD FOR DATA ERROR RECOVERY ON OPTICAL MEDIA UTILIZING HIERARCHICAL RECOVERY TECHNIQUES

(75) Inventor: Lawrence N. Taugher, Loveland, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,886

(22) Filed: Sep. 21, 1998

(51) Int. Cl.[7] ................................................. G11C 29/00
(52) U.S. Cl. ................... 714/769; 250/201.5; 369/44.14
(58) Field of Search ................................. 714/769, 761, 714/10, 25, 16, 48, 701, 762, 11, 778, 792, 774, 700, 763; 359/21, 15, 822, 819, 47, 44, 48; 341/100, 81, 59; 365/216; 369/59.24, 59.12, 116, 44.12, 13, 47.26, 47.54, 120, 32, 44.14, 47.55, 44.23–24; 360/40, 75, 31, 60, 1; 713/176; 250/559.45, 201.5; 356/239.1

(56) References Cited

U.S. PATENT DOCUMENTS

| | | | |
|---|---|---|---|
| 4,172,267 A | | 10/1979 | Sidman |
| 4,570,217 A | * | 2/1986 | Allen et al. .................... 700/83 |
| 4,801,794 A | * | 1/1989 | Kowalski et al. ......... 250/201.5 |
| 5,184,343 A | | 2/1993 | Johann et al. |
| 5,379,162 A | * | 1/1995 | Cunningham et al. ...... 714/769 |
| 5,446,710 A | * | 8/1995 | Gardner et al. .......... 369/44.14 |
| 5,537,382 A | * | 7/1996 | McLaughlin et al. ........ 369/116 |
| 5,587,975 A | * | 12/1996 | Kobayashi .................... 369/13 |
| 5,808,825 A | | 9/1998 | Okamura |
| 5,812,288 A | * | 9/1998 | Curtis et al. ................... 359/21 |
| 5,822,281 A | * | 10/1998 | Yumita ......................... 369/13 |
| 5,835,458 A | * | 11/1998 | Bischel et al. ........... 369/44.12 |
| 5,930,358 A | * | 7/1999 | Rao ............................ 713/193 |
| 6,038,682 A | * | 3/2000 | Norman ........................ 714/10 |

FOREIGN PATENT DOCUMENTS

| | | | |
|---|---|---|---|
| EP | 0447246 | 9/1991 | ........... G11B/5/012 |
| EP | 0661702 | 7/1995 | ........... G11B/20/18 |
| EP | 0836187 | 4/1998 | ........... G11B/20/18 |
| JP | 07231430 | 8/1995 | ........... G11B/7/00 |
| JP | 08315395 | 11/1996 | ........... G11B/7/12 |
| JP | 10186224 | 7/1998 | ........... G02B/13/00 |
| WO | WO98 27549 | 6/1998 | ........... G11B/7/00 |

OTHER PUBLICATIONS

Trelewicz, et al. (Bit error prediction for digital image data; IEEE, May 15, 1998).*

Chiar (Depth information aided image coding; IEEE, 1992).*

Berthouze, et al. (A camera neural model; IEEE, Oct. 17, 1996).*

Xiaopeng Chen et al (Near–optimal parallel distributed data detection for page–oriented optical memories; IEEE, Oct. 1998).*

* cited by examiner

Primary Examiner—Christine T. Tu
Assistant Examiner—Guy Lamarre

(57) ABSTRACT

A system and method for data error recovery uses a plurality of error correction routines in an attempt to provide data that can be used by the end user. In some situations the user is prompted for additional information and in some situations the data is provided with the errors highlighted. This system minimizes the amount of data that is unrecoverable. The system will work with CD discs or other storage media as well as with data lost by communication failures.

20 Claims, 3 Drawing Sheets

SYSTEM AND METHOD FOR DATA ERROR RECOVERY ON OPTICAL MEDIA UTILIZING HIERARCHICAL RECOVERY TECHNIQUES

TECHNICAL FIELD OF THE INVENTION

This invention relates to systems and methods for error recovery and more specifically to a system and method for recovering data using a progression of differing techniques.

BACKGROUND OF THE INVENTION

Currently, when errors are detected on a storage medium or on a transmission line, an attempt is usually made to correct the error or to reread the data in an effort to determine what the valid data should be. On CD-ROMS, the speed can be varied so that the data is read slower thereby increasing the chance that the data will be able to be read properly. This is one approach. However, there are many reasons why data is found to be in error. Errors can be generated by a number of different trouble events, such as, by way of example, dirt, scratches of the surface, wobble of the plane of the disc, pits, bits with ambiguous clocks (bit length) and surface imperfections, and even bits garbled in the transmission from one place (such as the read head) to another place (such as a checking device).

Some problems are related to how well the CD disc (or other movable surface) is balanced. If the disc is not very well balanced, it will move around and the data readers will have problems focusing on the proper data area. Contamination to the disc can cause problems as well. For example, CDs typically are not covered and thus are exposed to the environment. Fingerprints, dirt and scratches can cause problems for reading data.

In the prior art, as discussed, systems slow down and retry if they detect a number of errors. Sometimes error correction techniques are used to generate new acceptable data. Sometimes this is not possible, either because of the type of data or because the number of errors are too great.

When error correction, such as the Crossed Interleaved Reid-Solomon Code (CIRC), does not work, slowing the disc can reduce wobble and allow the read head to position properly. In some situations, some systems simply do not yield the correct data. In other systems, such as graphics, the data is presented with the failed data bit (or bits missing) allowing the user to go on with a slight defect in the graphics. In other situations, the program simply stops running and the user cannot go on with his/her work.

Thus a need exists in the art for a system of error recovery that allows an end user to recover as much valid data as possible under varying error causing events.

A further need exists in the art for such a system of data recovery that is efficient in time and which operates in substantially real time and which allows for the maximum recovery of faulty data.

The present invention relates to a system and method for recovering data from an optical media. In particular, the system and method institute a hierarchical series of data detection techniques designed to correct a data integrity fault associated with said optical media. Additionally, the system and method, when instituting the hierarchical series of techniques, first adjusts focal length when a pattern of other detected integrity faults has been previously detected.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figures 1, 2A:
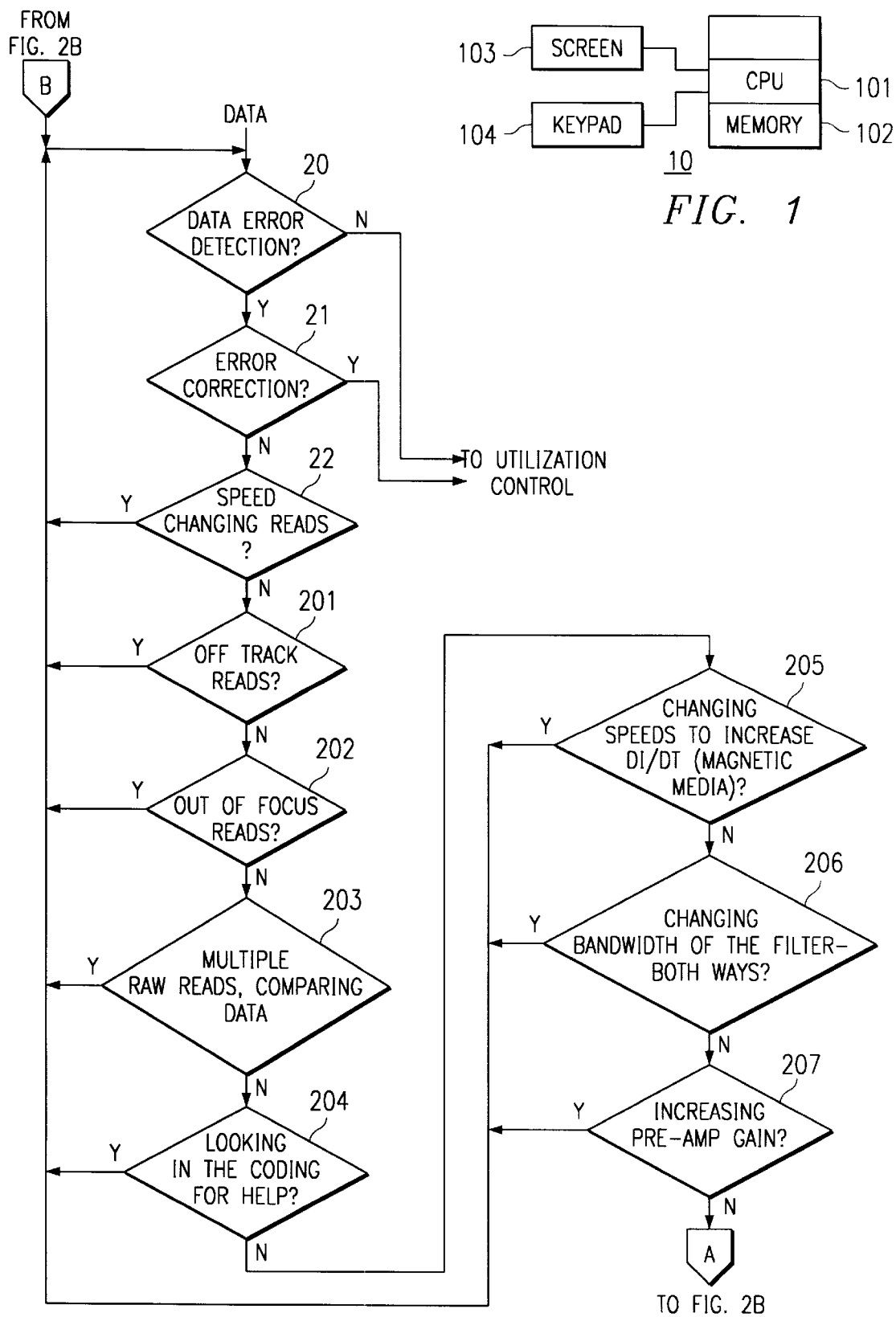
FIG. 1 shows a typical PC with the error correction system and method of this invention incorporated therein.
FIGS. 2A & 2B show a flow chart of the operation of the invention.

These and other objects, features and technical advantages are achieved by a system and method which comprises a series of different recovery techniques, both software and firmware, in order to recover data when it is not recoverable by conventional methods. This system and method are useful in a PC, a VCR, a MiniDisk, a DVD or even in a data recovery device separate therefrom. Portions of the system and method are also useful in correcting for data transmission errors across a communication medium. If the data still is not recoverable, even after all the techniques have been tried, the system describes what parts of the file are good and what is wrong with the data.

The approach taken is to use a hierarchical approach and cycle through a plurality of different error recovery techniques depending on the situation in an attempt to recover data which has somehow become corrupt, or unreadable. Error Correction Code (ECC) should be tried first since it is in the hardware and pretty much automatic. If ECC does not work, a different speed of rotation should be tried next; if that does not solve the problem, then the system goes into a series of measures to recover the data. Some of these measures include:

1. Off track reads
2. Out of focus reads (high or low)
3. Multiple raw reads, comparing data
4. Looking in the coding for help
5. Changing speeds—(currently done in ROMS, but not in hard disks) to increase DI/DT
6. Changing bandwidth of the data filter-both ways
7. Increasing pre-amp gain
8. Jerky spinning to remove dust
9. Jerky servo on focus or tracking
10. Attempting to detect a frequency spindle control and pre-compensating for it in the servos
11. Attempting to detect drop-out in 1 revolution then compensating for it on the next read
12. Use context (spelling, interpolating graphic files) check
13. Higher laser power with lower gain.

Turning now to FIG. 1, there is shown a typical PC 10 with CPU 101, memory 102, server 104 and keypad 105.

Figure 3:
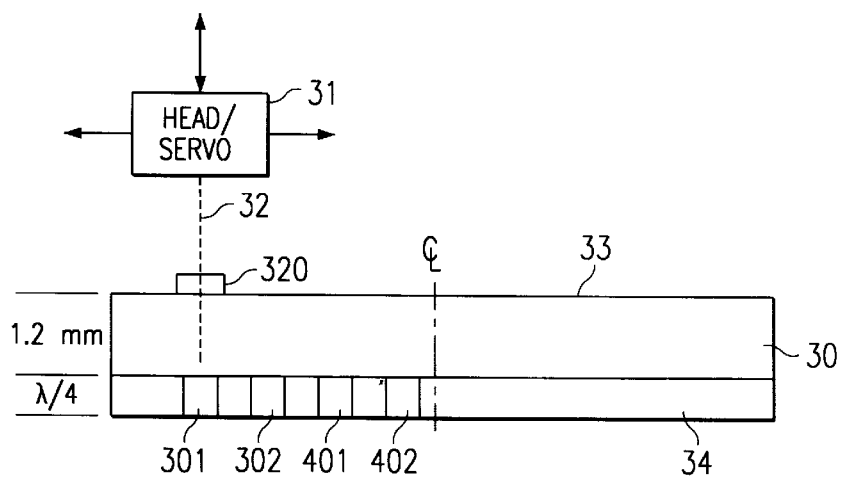
FIG. 3 is a side view of a data disc and read head system.

This invention will work with the hard drive of such a PC or with a CD, such as CD 30, FIG. 3, input or with tape or any other storage medium. In addition, this invention will work in any system where data is stored for subsequent retrieval, such as, for example, a VCR, a MiniDisk, a DVD or any other storage system. Portions of this invention will also work with a data transmission scheme to fix faulty received bits.

Figure 2B:
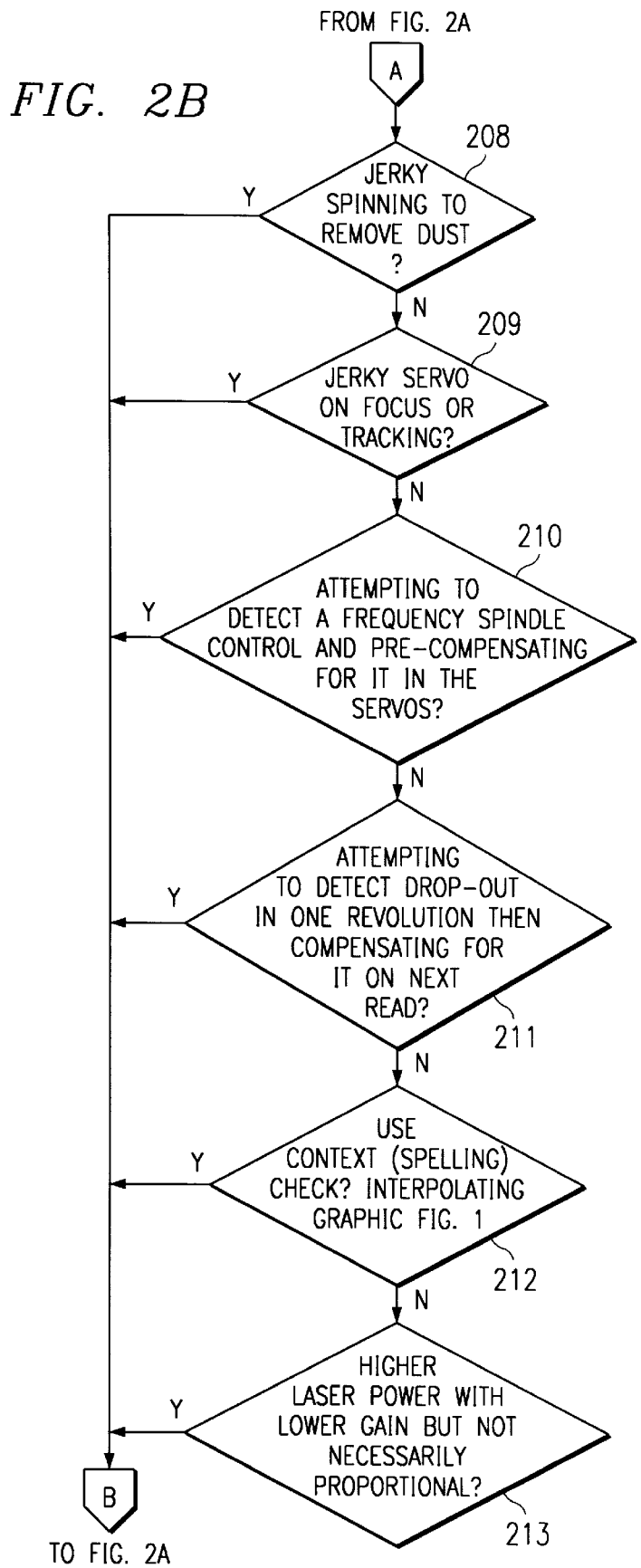
Figure 4:
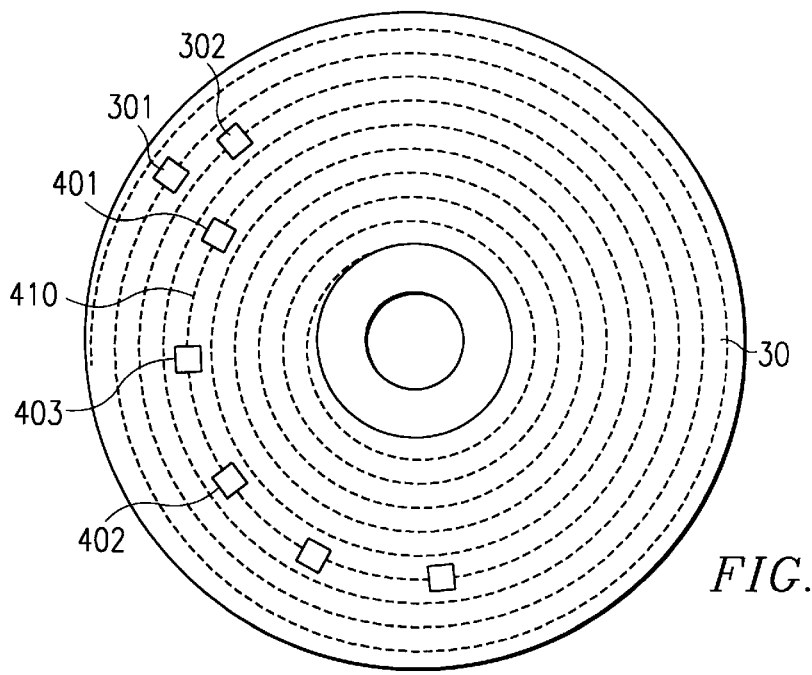
FIG. 4 is a top view of a data disc and head/servo.
Figure 5:
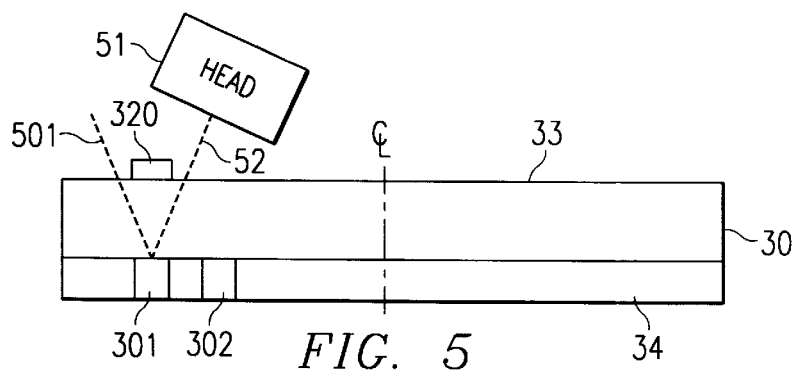
FIG. 5 is a side view of a data disc with an offset tilted read head.

The fundamental operation of the invention is shown in FIG. 2 where block 20 looks at data and passes it on for use if it is good and passes the data to block 21 if it is not. The operations shown in FIG. 2 are controlled by the memory storage device in cooperation with Head/Servo 31 (FIGS. 3–5).

Block 21 can be any one or more of the well-known data correction algorithms, such as the above-mentioned CIRC algorithm. In some situations, this step can be skipped if it is desired to simply read data without error correction. In this case the data would be used by block 203 for multiple compares on raw reads. If block 21 fails, then block 22 tries reading at several different speeds. If this fails, then one or more of steps 201–213 are used. It should be noted that these steps need not be in the order discussed and that some steps can and should be skipped under certain conditions (not shown) and that some steps can be performed in parallel while others are performed in series. Control for this is typically in the memory storage device (although new commands between the computer 10 and the memory storage device could be implemented to allow for the control to resided in computer 10. The results of each step can be used to direct which next step should be taken. For simplicity, the multiple paths and logic charts are not shown, but would be well-known to one skilled in the art after reading this description.

Block 201 is off-track reads. When a spot, such as spot 301, FIG. 3, cannot be read perhaps because smudge 320 is blocking the light signal, head 31 is moved a little distance off the track center in one direction to try to clear the smudge boundaries. If this is unsuccessful, then the system moves the head (or laser light 32, FIG. 3) to the other side of the track and tries again. Also, when the head is off track (off the track center), the angle of the head (light beam) can be changed (as shown in FIG. 5) so that head 51 is pointing at spot 301 and scanning it obliquely (via laser light 52). A CD disc is 1.2 mm thick. If there is a piece of dirt 320 or dust on the disc, it is on top surface 33 (FIG. 5), separated from the data which is on bottom surface 34 of the disc. In this manner, the read head is looking at the data from an angle, perhaps bypassing surface contamination 320. Return signal 501, however, will reflect at an angle which requires a receiver (not shown) on the other side of the track. A problem with this operation is that the optical head is not designed to move at an angle; it can move up and down and sideways, but it cannot tilt. Thus, tilting would only be done when the heads can tilt and the angular return signal can be captured.

Box 202 deals with out of focus reads and refers to a compromise in the CD reading system.

With a stamped disc the distance from the land to the pit is $\frac{1}{6}\lambda$. This distance was selected as a compromise optimum light reflectivity for tracking and optimum light reflectivity between land and pits. Light reflecting off a land is reflected 180° thus canceling out the incoming light. Light reflecting off a pit travels an additional $\frac{1}{4}\lambda$. It also is reflected 180° but has to travel a total of $\frac{1}{2}\lambda$ farther than the light reflecting off a land. This additional $\frac{1}{2}\lambda$ amounts to an additional 180° phase shift thus the total phase shift is 360°. Thus the reflected light off a pit is in phase with the incoming light, therefore the incoming light is added to the outgoing light. So with pits $\frac{1}{4}\lambda$ deep no light is received over lands and 2× light is received over pits. Note that the phase of the incoming light has no effect on this. Only the distance between the land and a pit effects this; out of focus will not change this.

If the pit was $\frac{1}{8}\lambda$ deep the same thing as described above would happen on lands. On pits the total distance travel is $\frac{1}{4}\lambda$ or 90° out of phase with the incoming light. This creates the optimum interface pattern for the push-pull tracking signal.

A compromise of the best push-pull tracking signal and the maximum difference in light between a land and a pit was made and $\frac{1}{6}\lambda$ was chosen.

In operation, the system goes once around the disc and sees the spot where the error (or errors) is located and makes a guess as to the type of error. The system then predicts when the head will be over each error spot again. At the proper time, the servo changes the focal length of the light to whatever is appropriate. This is done for small increments of time, but may be done many times. If a pattern develops, i.e. a scratch which covers many tracks, then the system could anticipate that when the scratch zone is being read in each track, it should adjust the focal length immediately upon detection of an error. It should be noted that typically the track is a continued spiral and thus there is technically only one track. However, for ease of discussion let us assume multiple tracks are present.

Box 203 controls multiple raw reads, comparing data, and maximum likelihood. Since some patterns of data are illegal, if the system detects an illegal pattern, it can try to look at the closest match to that pattern of data and correct the data accordingly. Also doing multiple raw reads at several different speeds a histogram of each bit can be compiled. As an example we will use one byte (8 bits) are read in error. This is not a realistic example because the error correction could easily correct on byte in error. In practical terms this would need to be expanded greatly to the point the current error correction would fail, but for simplicity we will use one byte. So this byte is read back at 1×10 times and at 2×10 times and at 4×10 times and the result is in the table below.

The table below was constructed by randomly changing one bit in each value.

| Speed | Value | Value | Value | Value | Value | Value | Value | Value | Value | Value |
|---|---|---|---|---|---|---|---|---|---|---|
| 1× | 1011 | 1001 | 1011 | 0011 | 1011 | 1011 | 1111 | 1011 | 1001 | 1011 |
| 2× | 1001 | 1111 | 1011 | 1011 | 1001 | 1011 | 1011 | 1001 | 1011 | 1011 |
| 4× | 1001 | 1010 | 1011 | 1011 | 1111 | 1011 | 1001 | 1011 | 1011 | 1111 |

Now by counting the number of times each bit is either a one or a zero the following table is obtained.

|  | Bit 7 | Bit 6 | Bit 6 | Bit 4 | Bit 3 | Bit 2 | Bit 1 | Bit 0 |
|---|---|---|---|---|---|---|---|---|
| Number of times a 1 | 29 | 4 | 23 | 29 | 7 | 3 | 28 | 3 |
| Number of times a 0 | 1 | 26 | 7 | 1 | 23 | 27 | 2 | 27 |

By selecting the most likely value for each bit the byte selected would be 10110010.

In some situations the coding itself can help to correct errors together.

In laser technology, there is a clock (clock T). The smallest pit must have three clocks in it. This is a 3T pit. The largest pit will have 11 clocks or 11T. The number of clocks is the pit length. It is important to determine the clock size of a pit in order to obtain proper data reads. Often, however, the size is corrupted or confused, resulting in data integrity faults.

Assume now that the system knows it is getting a number of errors, especially on those bits on the edge between a 3T and a 4T pit. The system then reads that spot on the edge over and over again and if it comes up with more 3Ts than 4Ts, it calls that spot 3T. This is what the multiple raw reads is all about. This technique should be invoked after ECC has failed and is useful for reconstructing data transmission errors also.

It is important to note that the concepts discussed here operate automatically, without user intervention. If it becomes necessary to invoke these techniques, the system would use a dialog box to inform the user that the data was recovered but that the user may want to consider saving the data to a different disc or cleaning the disc, so that future "reads" will be easier, or less susceptible to errors. Or alternatively if only a small area on the disc has this problem the data could be moved to a good area on the disc (this is called sparing) without the user's knowledge.

On magnetic drives, such as a hard disk, the strength of the signal is proportional to the derivative of the current divided by the derivative of time (dI/dt). Thus, the faster the magnetic media moves across the head, the stronger the resultant signal will be. When an error occurs on a tape or other magnetic type device, the system may want to attempt a retry at a faster speed, which will yield a stronger signal. This is controlled by Box 205.

Box 206 shows a change of bandwidth of the noise filter. A filter does exactly that. It filters out what should be noise. This filter is located in the read channel and is normally set to a fixed bandwidth; therefore frequencies that are too low or too high will not pass through the filter. Only the anticipated frequency of the data passes through. If the bandwidth is increased, more signal passes but also more noise, which is a problem. With certain errors having more signal may be more advantageous than having fixed bandwidth. On the other hand, in a contaminant situation, the noise may creep into the signal bandwidth. Thus, by decreasing the filter bandwidth, there may be less noise without decreasing the signal proportionately or sacrificing the signal. Consequently, a cleaner signal will result.

Box 207 shows increase in pre-amp gain. This technique is used to boost a signal that has been received before going into the filter. Since the system may vary the bandwidth of the filter, it might be appropriate to vary the gain. When bandwidth is narrowed, more of the signal is filtered out and boosting the gain compensates for this. If the bandwidth is increased yielding more noise than data, the system may try to decrease the gain.

Box 208 shows jerky spin to remove dust. The goal is to jiggle off the dust. The system could spin the disc in the reverse direction, although current technology does not allow for this. A forward jerky motion (or up-down motion) would basically jiggle the disc to remove dust, perhaps coupled with an air (or vacuum) blast.

A problem with dust is that it is attracted to static electricity, and polycarbonates (such as CD's) are notorious for attracting static electricity. Counter active static electrical charges could be added to attract the dust away. This could be accomplished by wiping the disc with a metallic substance acting as a discharge line.

With the jerky servo or focus on tracking box 209, imagine that the system is servoing along and having trouble tracking because the disc is very much out-of-balance. This unbalance could result from the use of an inadequate mechanism for clamping the disc or from a situation where the shaft and other components are not really true. The other, and more likely, cause could be attributed to the adherence of a label improperly onto the disc. Such a label could cover ½ of the disc surface; it would also add weight. When the disc is spinning at very high speeds, the label could cause this out-of-balance situation to occur.

As the disc is spinning, the system observes that it is out-of-balance in a certain manner. The disc is either warped, which would cause an up and down movement, or the disc may be moving laterally. When the system figures out the type of movement by observing multiple reads, the servo system is adjusted to predict the next occurrence of that problem in advance. The system will then direct the servo to move before it hits the "bad" area, thereby anticipating the imbalance (either up/down or in/out). Box 210 shows detection of a frequency to spindle control and pre-compensates for it in servos in the manner just described. The head servo has several coils (not shown) which either go up and down or right and left, or axial. The servo is directed using these servos.

Box 211 shows the system detecting drop-out in one revolution then compensating for it on the next read as was discussed above. If there is an area on the disc where the system is not getting a strong enough signal to recover any data, the system, using its CPU power, will predict when that area will come up and adapt the laser power and increase it so that there will be more light from that spot.

Box 212 uses context checking. The system tells the user that it was not able to recover a specific portion of data and asks the user to fix it. In the case of raw ASCII text, the system could give the user back the whole file of text and highlight the area of the text it is having trouble with. For example, in "The brown fox jumped over the fence," we may not get the "b" in brown and the "o" in fox, so we would highlight those areas and ask the user to fix the data.

In more complicated situations, like in Word or Excel, there might be a problem, for example, with the font. Assume, we are not able to recover the data that tells us what font is to be used. Consequently, the system asks the user to supply the font information and then the system will supply the data in the font selected. Sometimes the system will not know what application to use and will ask the user for input.

The system would try to automatically determine the type of file being recovered. If it can not then the system could say (by voice or on the screen), "What was this file written in, Word or WordPerfect for Windows, or Excel or what?". This could be done after an educated guess is made by the system to give as many clues as possible. Then the system would ask the user if the guess was correct. Since most files are titled with a dot followed by three letters, which reveals what application wrote it, the system would take an educated guess based on "form," the "name," other files around it, information contained within the file, etc.

Once the system knows the file format it would go into an algorithm that would differ somewhat with each program; and it would essentially instruct the user as to how to correct the problem. Thus, the system will interact with the user in an attempt to capture the corrupt (or missing) data. Spell check could be run on certain file types to correct the data. On graphic files the image around the missing data could be used to interpolate the missing data. On audio files a smooth transition from one sound to the next could be used.

Note that while we are talking about corrupt data, it might be that, as discussed above, there is no data, or the data is available but has a high probability of being wrong. Also, the lost data might be one bit or many bits. Using this arrangement, data files which otherwise might be lost would be saved, and at least the "good" data presented to the user.

If all else fails, the system can go to box 213 and use higher laser power with lower gain in the read amplifier. If the data cannot be recovered, and the system has tried everything, including asking the user to clean the disc, it maybe time to try measures which have a possibility of destroying the data being. Typically, this will be done only with user input. By increasing the laser power, the light could actually burn through contaminants and try to "see" the data. This could result in data being changed. To do this it will usually be necessary to lower gain because with increased light, the amplifiers might saturate. However, if the light is actually going through dirt, it will loose energy. This loss is not proportional to the light coming back since some of the light will be absorbed or scattered by the contaminant and gain adjustment is not proportional.

Although the present invention and its advantages have been described in detail, it should be understood that various changes, substitutions and alterations can be made herein without departing from the spirit and scope of the invention as defined by the appended claims.

What is claimed is:

1. A method of obtaining data from an optical storage medium, said method comprising the steps of:

reading data from said optical storage medium;

determining whether said read data has its integrity intact; and upon a detected integrity fault, instituting a hierarchical series of data detection techniques designed to correct said data integrity fault, wherein the step of instituting comprises first adjusting focal length when a pattern of other detected integrity faults has been previously detected.

2. The method of claim 1 wherein said hierarchical series of techniques comprises repetitively detecting whether a pit possesses N or N+1 clocks after attempting to utilize error correction code (ECC).

3. The method of claim 2 wherein said hierarchical series comprises adjusting position and angular orientation of an optical head to perform an off-track read.

4. The method of claim 1 wherein said instituting step comprises the step of:

selecting a detection technique from a list of said techniques.

5. The method of claim 1 wherein said instituting step comprises interacting with a user to obtain user input.

6. The method of claim 1 wherein said instituting step comprises determining a probable format of the data file to which the data with the integrity fault belongs.

7. The method of claim 6 further including the step of:

presenting the data file to a user with the data having the integrity fault identified.

8. The method of claim 1 wherein said hierarchical series of data techniques comprises at least one technique selected from:

looking in coding for help;

changing bandwidth of a data filter;

increasing pre-amp gain;

jerky spinning to remove dust;

jerky servo on focus or tracking;

attempting to detect a frequency spindle control and pre-compensating for it in servos;

use context checking; and higher laser power.

9. A system of obtaining data from an optical storage medium, said method comprising the steps of:

means for reading data from said optical storage medium;

means for determining whether said read data has its integrity intact; and means for, upon a detected integrity fault, instituting a hierarchical series of data detection techniques designed to correct said data integrity fault, wherein the step of instituting comprises first adjusting focal length when a pattern of other detected integrity faults has been previously detected.

10. The system of claim 9 wherein said hierarchical series of techniques comprises repetitively detecting whether a pit possesses N or N+1 clocks after attempting to utilize error correction code (ECC).

11. The system of claim 10 wherein said hierarchical series comprises adjusting position and angular orientation of an optical head to perform an off-track read.

12. The system of claim 9 wherein means for instituting selects a detection technique from a list of said techniques.

13. The system of claim 9 wherein means for instituting step interacts with a user to obtain user input.

14. The system of claim 9 wherein said means for instituting determines a probable format of the data file to which the data with the integrity fault belongs.

15. The system of claim 14 further comprising:

means for presenting the data file to a user with the data having the integrity fault identified.

16. The system of claim 9 wherein said hierarchical series of data techniques comprises at least one technique selected from:

looking in coding for help;
changing bandwidth of a data filter;
increasing pre-amp gain;
jerky spinning to remove dust;
jerky servo on focus or tracking;
attempting to detect a frequency spindle control and pre-compensating for it in servos;
use context checking; and
higher laser power.

17. A method of obtaining data from an optical storage medium, said method comprising the steps of:

reading data from said optical storage medium;

determining whether said read data has its integrity intact; and upon a detected integrity fault, instituting a hierarchical series of data detection techniques designed to correct said data integrity fault, wherein the step of instituting comprises first adjusting focal length when a pattern of other detected integrity faults has been previously detected, wherein said hierarchical series of techniques comprises repetitively detecting whether a pit possesses N or N+1 clocks after attempting to utilize error correction code (ECC), and wherein said hierarchical series comprises adjusting position and angular orientation of an optical head to perform an off-track read.

18. The method of claim 17 wherein said instituting step comprises the step of:

selecting a detection technique from a list of said techniques.

19. The method of claim 17 wherein said instituting step comprises interacting with a user to obtain user input.

20. The method of claim 17 wherein said instituting step comprises determining a probable format of the data file to which the data with the integrity fault belongs.

* * * * *